United States Patent
Huang

(10) Patent No.: US 11,336,149 B1
(45) Date of Patent: May 17, 2022

(54) PERMANENT MAGNET ALTERNATOR

(71) Applicant: Hsun Chien Huang, New Taipei (TW)

(72) Inventor: Hsun Chien Huang, New Taipei (TW)

(*) Notice: Subject to any disclaimer, the term of this patent is extended or adjusted under 35 U.S.C. 154(b) by 57 days.

(21) Appl. No.: 17/097,338

(22) Filed: Nov. 13, 2020

(51) Int. Cl.
*H02K 7/18* (2006.01)
*H02K 5/20* (2006.01)
*H02K 21/22* (2006.01)
*F02B 63/04* (2006.01)
*H02K 9/06* (2006.01)

(52) U.S. Cl.
CPC ......... *H02K 7/1815* (2013.01); *F02B 63/042* (2013.01); *H02K 5/20* (2013.01); *H02K 9/06* (2013.01); *H02K 21/22* (2013.01); *H02K 2205/09* (2013.01)

(58) Field of Classification Search
CPC .......... H02K 7/1815; H02K 5/20; H02K 9/06; H02K 21/22; H02K 2205/09; F02B 63/042
See application file for complete search history.

(56) References Cited

U.S. PATENT DOCUMENTS

2011/0229358 A1* 9/2011 Streng ............... H02K 9/06
417/423.14

* cited by examiner

*Primary Examiner* — Viet P Nguyen
(74) *Attorney, Agent, or Firm* — Birch, Stewart, Kolasch & Birch, LLP

(57) ABSTRACT

A permanent magnet alternator is adapted to be connected to an engine and has a stator, a driven plate, and a rotor. The stator is mounted on the engine. The driven plate is connected to an output shaft in front of the engine and covers the stator. Multiple ventilation holes are formed through the driven plate such that air can remove heat from the stator via the ventilation holes. The rotor is fixed in the rotor recess and has a magnet-mounting ring and multiple magnets. The magnets are mounted on the magnet-mounting ring. An annular radial gap is formed between the magnetic mounting ring and a wall of the rotor recess. The magnet-mounting ring is fixed to the driven plate using ring fasteners such that radial position of the magnet-mounting ring can be adjusted. Therefore, the alternator vibrates less, has better heat dissipation and reduces weight.

14 Claims, 22 Drawing Sheets

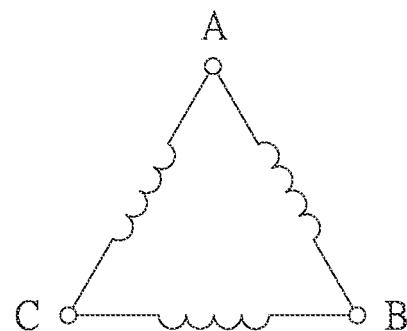
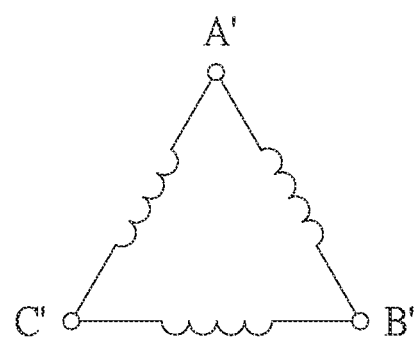
FIG. 12

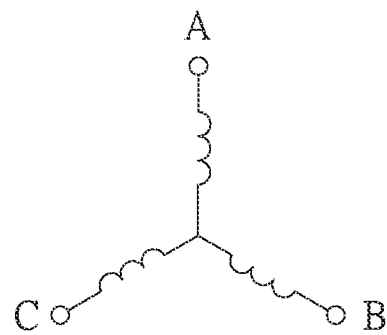
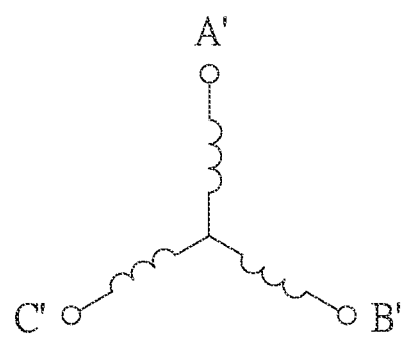
FIG. 14

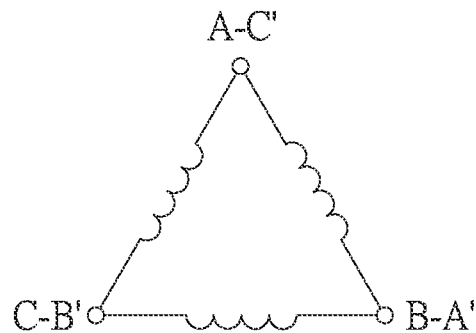
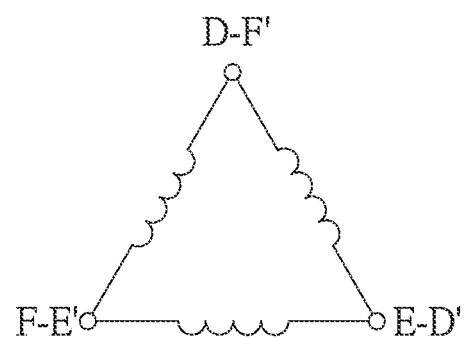
FIG. 16

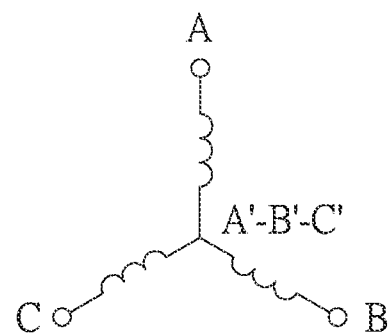
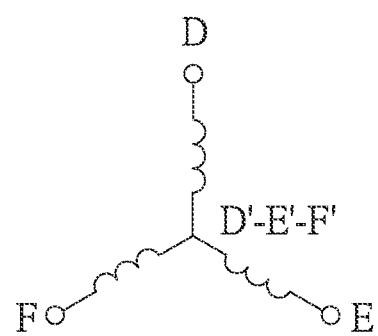
FIG. 18

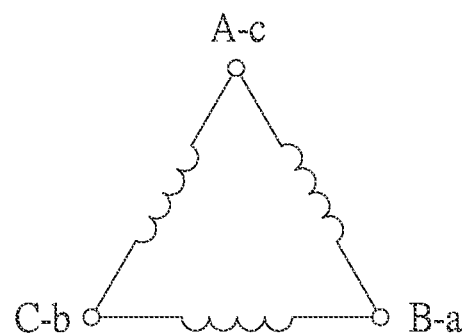
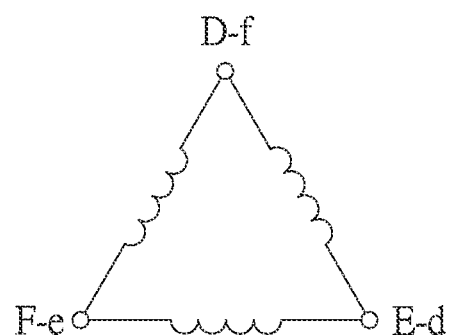
FIG. 20

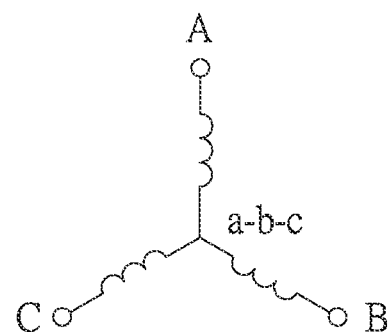
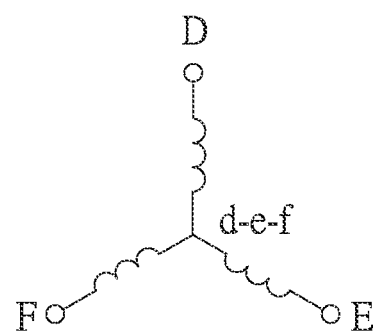
FIG. 22

PERMANENT MAGNET ALTERNATOR

BACKGROUND OF THE INVENTION

1. Field of the Invention

The present invention relates to a permanent magnet alternator, especially to an alternator of a vehicle that is driven by an engine.

2. Description of the Prior Arts

Conventional permanent magnet alternators have the following shortcomings:

First, center of gravity of its rotor is often out of alignment with a rotating axis of the rotor due to factors such as tolerance, causing the rotor to vibrate due to dynamic imbalance.

Second, the alternator generates heats when at work, causing temperature of the alternator to increase. When the alternator is installed adjacent to an engine of a vehicle, the alternator is heated up by the engine and causes the temperature of the alternator to increase further. As a result, stator coils are easily damaged due to overheat resulted from poor heat dissipation.

Third, the conventional engine needs to have an independent flywheel to stabilize idle speed of the engine, thereby increasing weight of the vehicle and reducing energy efficiency.

To overcome the shortcomings, the present invention provides a permanent magnet alternator to mitigate or obviate the aforementioned problems.

SUMMARY OF THE INVENTION

The main objective of the present invention is to provide a permanent magnet alternator that vibrates less, has better heat dissipation and reduces weight of a vehicle.

The permanent magnet alternator is adapted to be connected to an engine and has a stator, a driven plate, and a rotor. The stator is adapted to be mounted on an end of the engine, and is disposed apart from the engine to form a forced heat transfer space. The forced heat transfer space is in gaseous communication with an external space. The stator has multiple coils that are disposed apart from each other around a crankshaft of the engine. The driven plate is adapted to be connected to the crankshaft of the engine. The driven plate covers the stator and is rotatable relative to the stator. The driven plate has a rotor recess and multiple ventilation holes. The rotor recess is formed in the driven plate. An opening of the rotor recess is directed towards the engine and is in gaseous communication with the forced heat transfer space. The rotor recess has an annular mounting surface and a bottom surface. The annular mounting surface is located around the stator. The stator is located between the bottom surface and the engine. The ventilation holes are formed in the bottom surface of the rotor recess and through the driven plate. The ventilation holes are disposed apart from each other around the crankshaft. Air is capable of entering the rotor recess via the ventilation holes and flowing towards the forced heat transfer space via gaps formed between the coils. The rotor is fixed in the rotor recess and has a magnet-mounting ring, multiple ring fasteners, and multiple magnets. The magnet-mounting ring is located around the stator. An outer annular surface of the magnet-mounting ring is disposed apart from the annular mounting surface of the rotor recess to form a radial gap. The ring fasteners are mounted between the magnet-mounting ring and the driven plate. The ring fasteners are disposed apart from each other around the magnet-mounting ring. The ring fasteners are capable of fixing the magnet-mounting ring in multiple radial positions relative to the driven plate. The magnets are mounted on an inner annular surface of the magnet-mounting ring and disposed apart from each other around the stator.

The advantages of the present inventions are as follows.

First, by forming the radial gap between the rotor and the driven plate, radial position of the center of gravity of the rotor can be adjusted using the ring fasteners. Therefore, even if the center of gravity of the rotor is not in alignment with rotation axis due to factors such as manufacturing tolerances, dynamic imbalance of the assembled driven plate and the rotor can be calibrated using the ring fasters to reduce vibration of the alternator.

Second, when the engine drives a propeller mounted in front of the engine, and the alternator is located between the propeller and the engine, negative pressure is formed in the forced heat transfer space due to airflow generated by the propeller. Therefore, air is sucked into the rotor recess via ventilation holes, then flows through gaps between the coils to remove heat from the stators, and finally flows towards the forced heat transfer space. As a result, the stator is cooled down by air flowing through the ventilation holes to prevent the coils from overheat while maintaining current output.

Third, total inertial of the assembled driven plate and the rotor stabilize idle speed of the engine, serving the same function as a flywheel of a conventional engine. Therefore, the engine no longer have to install a standalone flywheel, thereby reducing weight of the vehicle and improves energy efficiency.

Other objectives, advantages and novel features of the invention will become more apparent from the following detailed description when taken in conjunction with the accompanying drawings.

BRIEF DESCRIPTION OF THE DRAWINGS

FIGS. 11 and 12 are schematic circuit diagrams of a first configuration of the winding arrangements of a stator, connected to form two delta-connected power supplies;

FIGS. 13 and 14 are schematic circuit diagrams of the first configuration of the winding arrangements of the stator, connected to form two wye-connected power supplies;

FIGS. 15 and 16 are schematic circuit diagrams of a second configuration of the winding arrangements of the stator, connected to form two delta-connected power supplies;

FIGS. 17 and 18 are schematic circuit diagrams of the second configuration of the winding arrangements of the stator, connected to form two wye-connected power supplies;

FIGS. 19 and 20 are schematic circuit diagrams of a third configuration of the winding arrangements of the stator, connected to form two delta-connected power supplies; and FIGS. 21 and 22 are schematic circuit diagrams of the third configuration of the winding arrangements of the stator, connected to form two wye-connected power supplies.

DETAILED DESCRIPTION OF THE PREFERRED EMBODIMENTS

Figure 1:
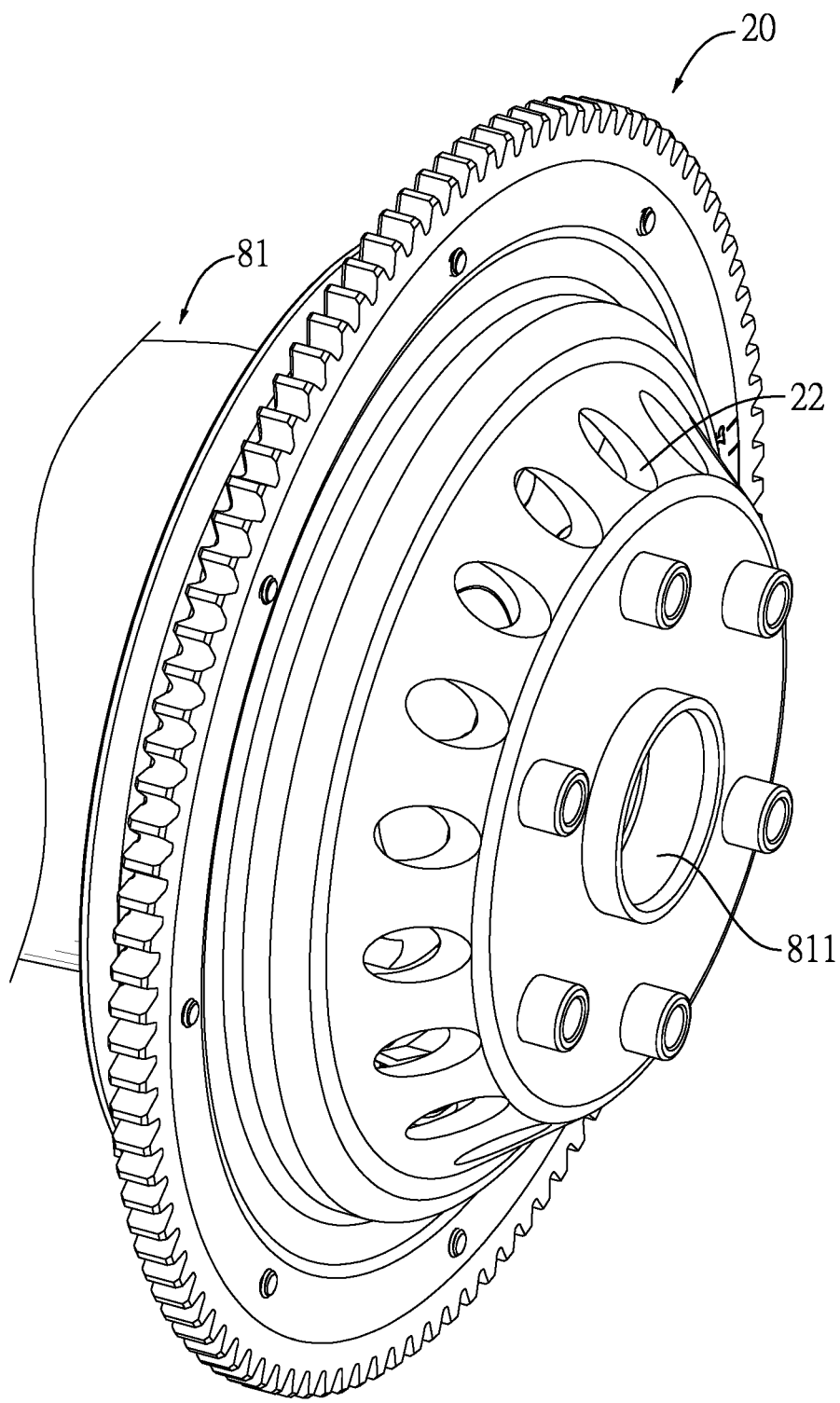
FIG. 1 is a perspective view of a permanent magnet alternator in accordance with the present invention connected to an engine.
Figure 3:
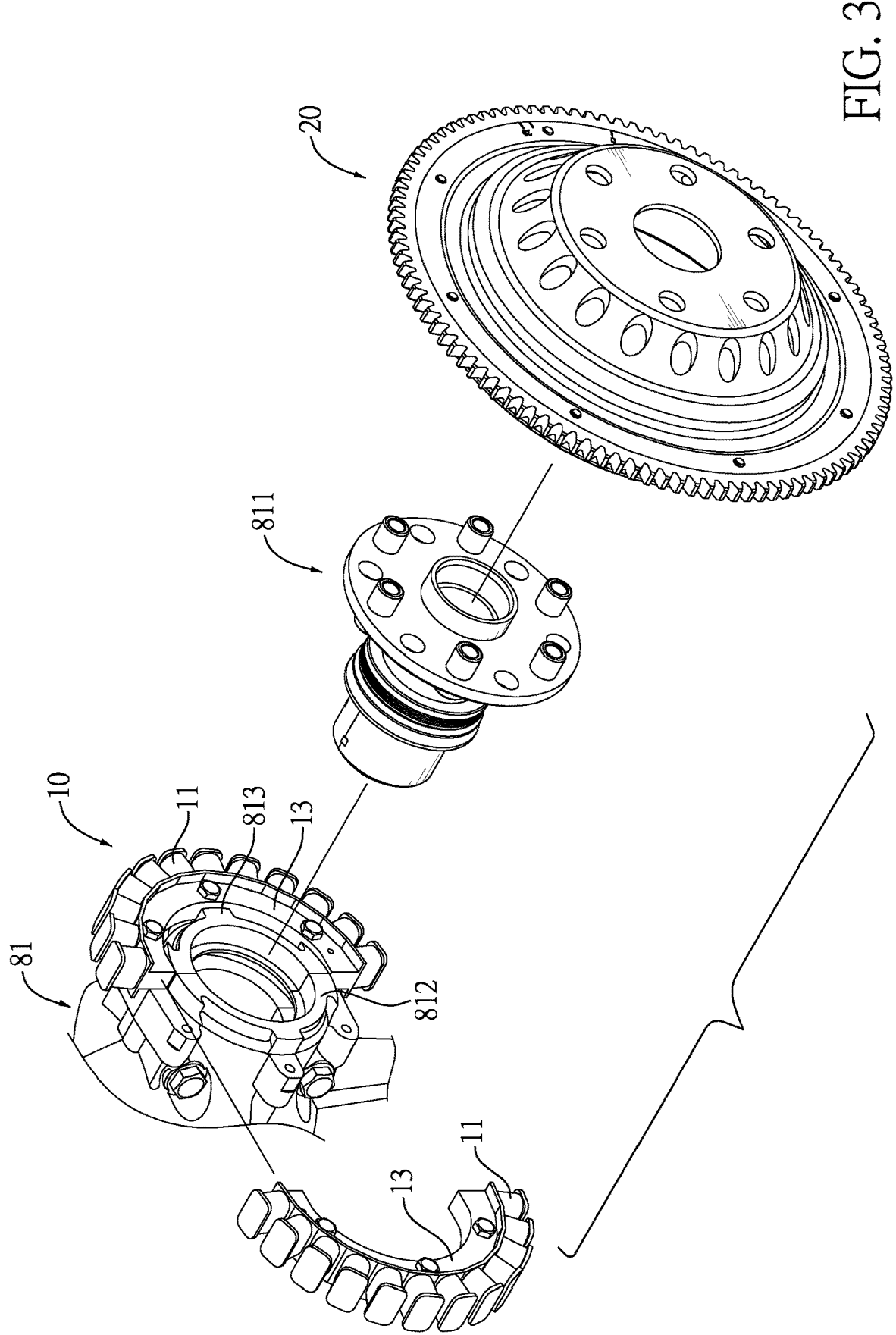
FIG. 3 is an exploded view of the permanent magnet alternator and the engine in FIG. 1.
Figure 4:
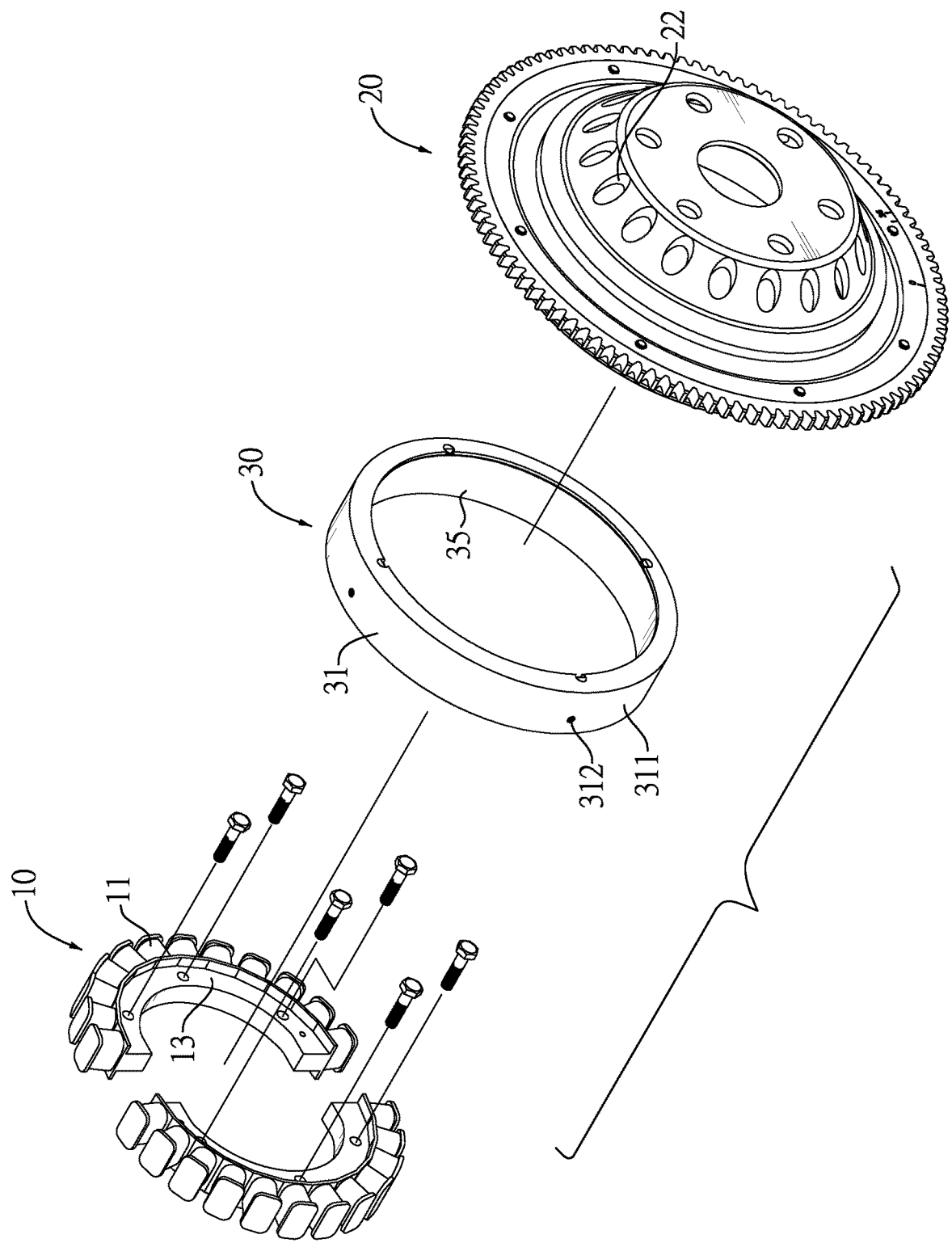
FIG. 4 is an exploded view of the permanent magnet alternator and the engine in FIG. 2.
Figure 5:
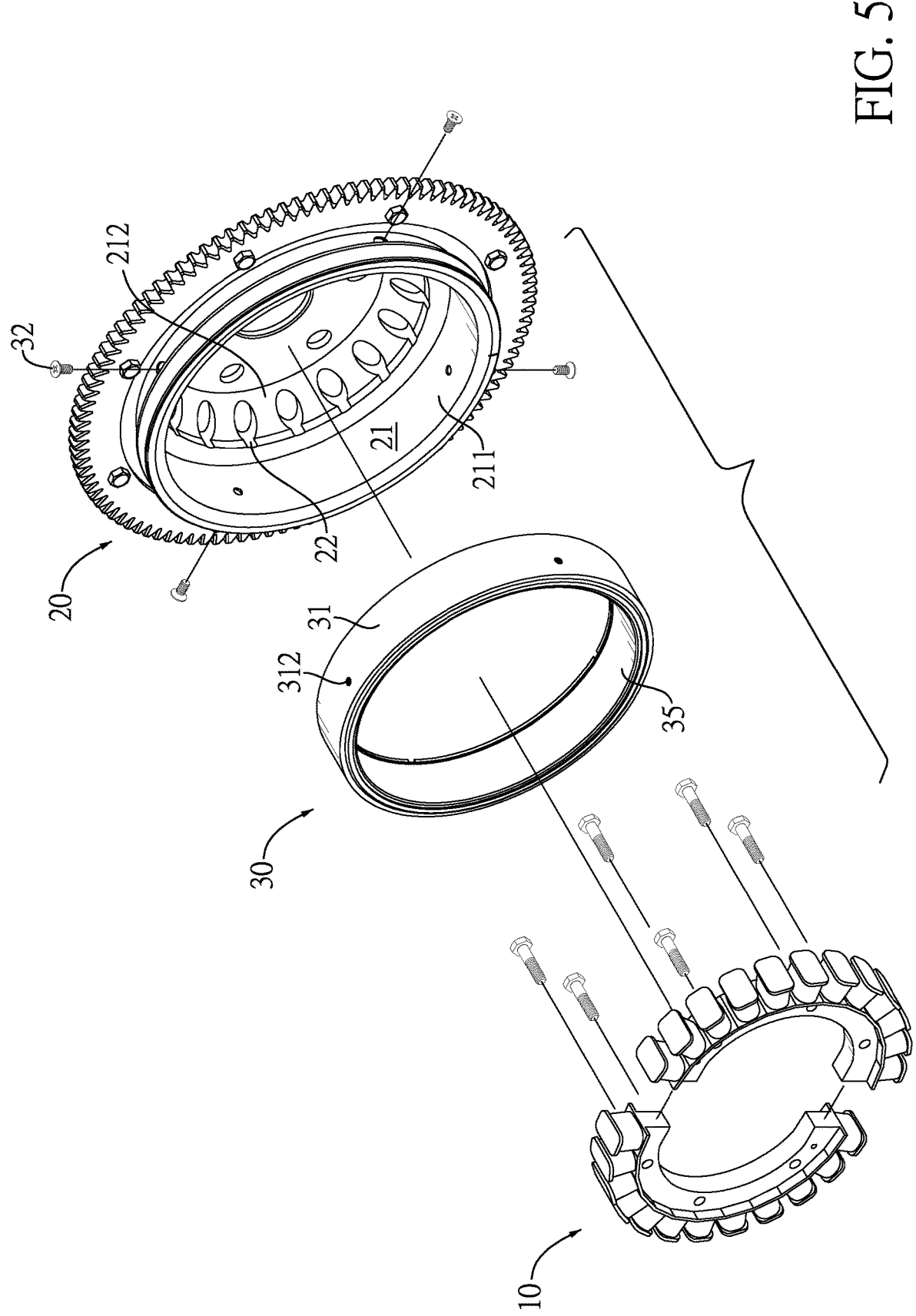
FIG. 5 is an exploded view of the permanent magnet alternator and the engine in FIG. 2, viewed from a different angle than in FIG. 4.
Figure 6:
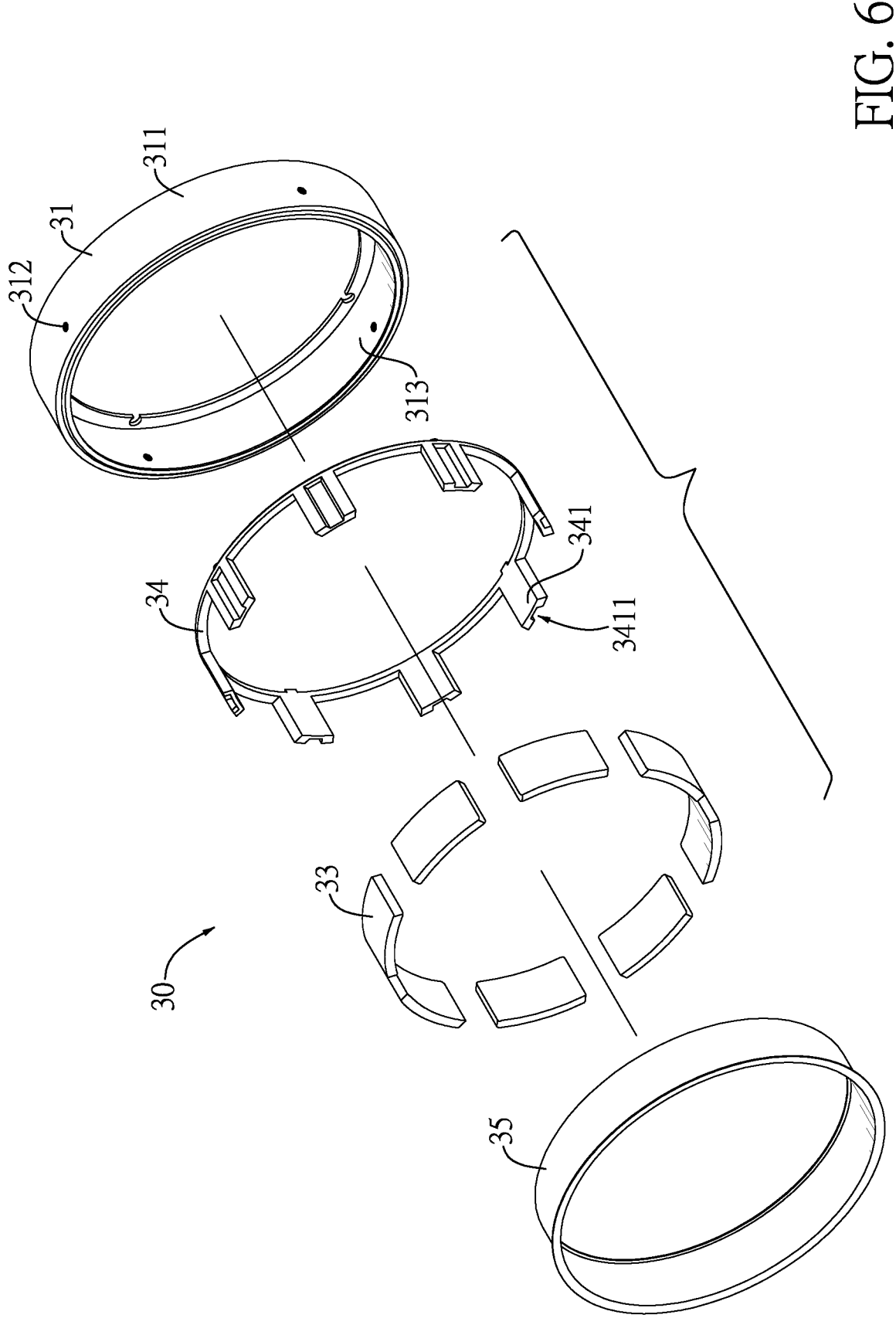
FIG. 6 is an exploded view of a rotor of the permanent magnet alternator in FIG. 5.
Figure 7:
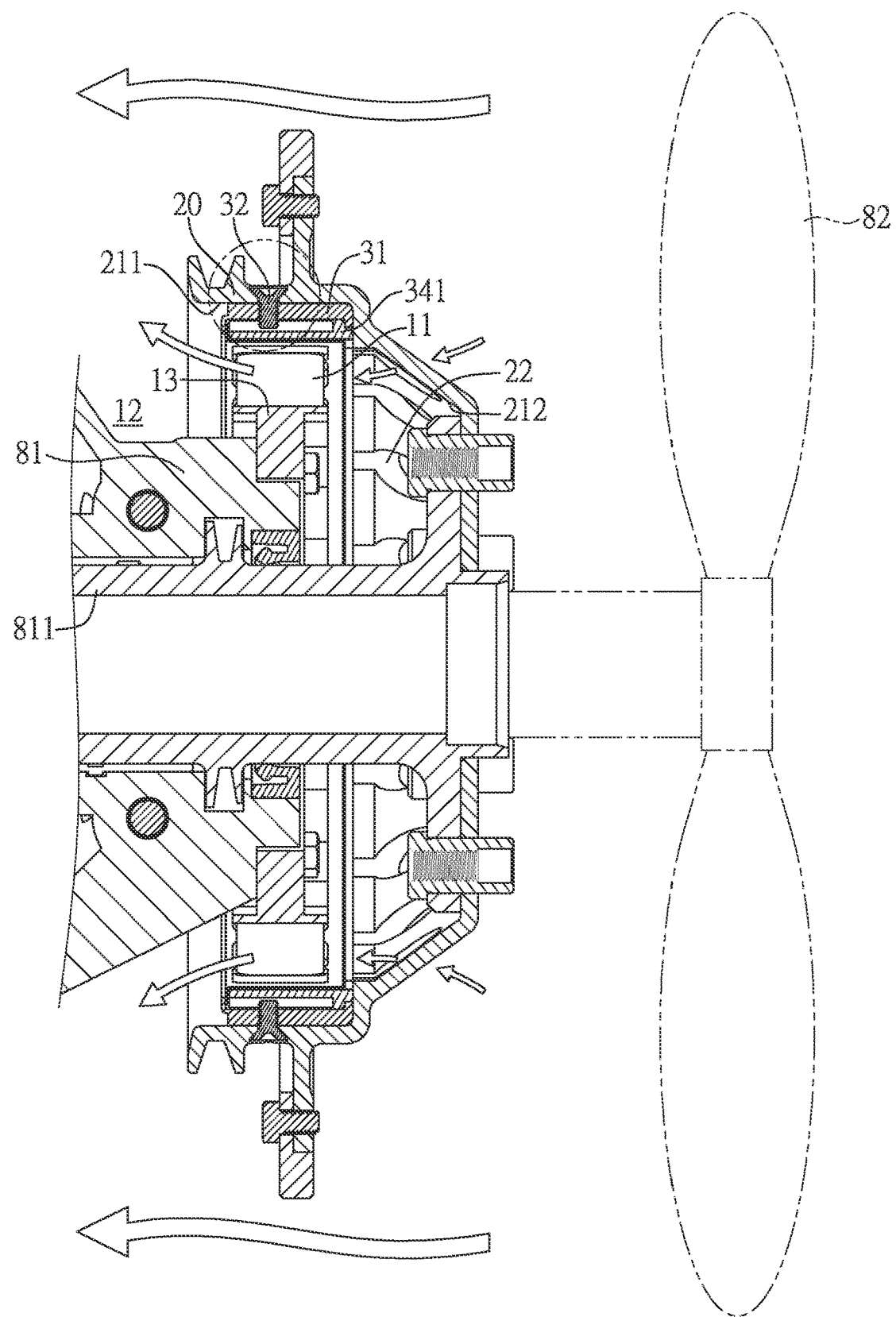
FIG. 7 is a cross-sectional view of the permanent magnet alternator in FIG. 1.

With reference to FIGS. 1, 3, and 7, a permanent magnet alternator in accordance with the present invention is connected to a front end of a small piston engine 81 and serves as independent power supply for an ignition distributor or other power transferring parts (not shown in figures). A propeller 82 is mounted in front of the engine 81 and the alternator.

Figure 2:
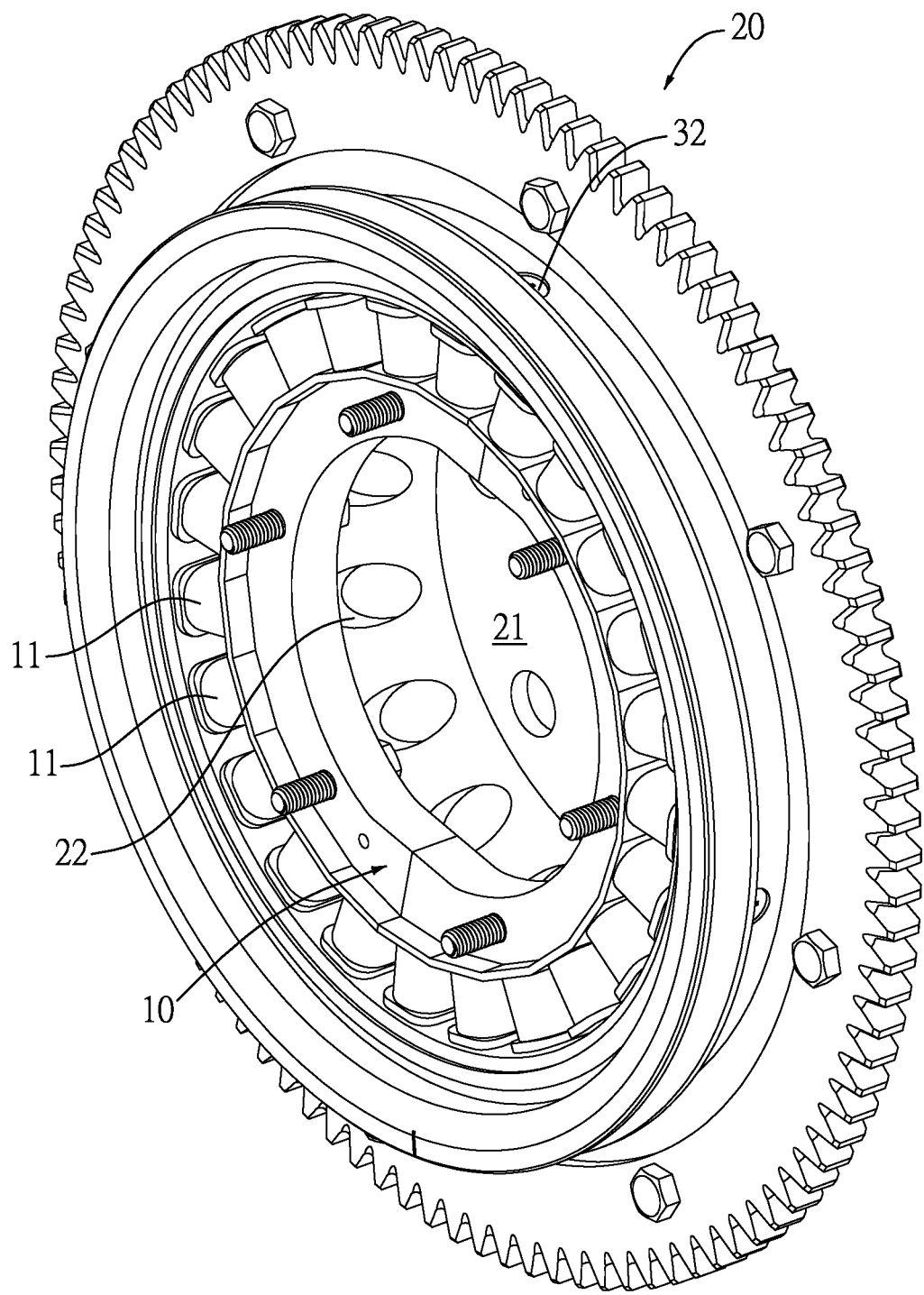
FIG. 2 is a perspective view of the permanent magnet alternator in FIG. 1.

An output shaft 811 is protruded from the front end of the engine 81 and drives the propeller 82. The output shaft 811 is preferably a crankshaft. In the preferred embodiment, the engine 81 has two casings 812 (as shown in FIG. 2) which are located on two opposite sides of the output shaft 811, and the two casings 812 are connected and arranged along a radial direction of the output shaft 811. The two casings 812 are respectively a left casing and a right casing. The permanent magnet alternator comprises a stator 10, a driven plate 20, and a rotor 30.

The stator 10 is mounted on the front end of the engine 81 and has multiple coils 11. The coils 11 are disposed apart from each other around the output shaft 811 of the engine 81. The stator 10 is disposed apart from the engine 81 to form a forced heat transfer space 12 (as shown in FIG. 7), and to be specific, the coils 11 of the stator 10 are disposed apart from the engine 81 to form the forced heat transfer space 12. The forced heat transfer space 12 is in gaseous communication with the external space.

In the preferred embodiment, the stator 10 has two stator cores 13 which are respectively mounted on the two casings 812 of the engine 81 for ease of installation; that is, the two stator cores 13 can be mounted on the engine 81 in opposite radial directions of the output shaft 811 such that components, for example, the propeller 82, do not have to be removed before mounting the stator core 10.

The stator cores 13 are curved. Two opposite ends of each one of the stator cores 13 extend towards the other one of the stator cores 13. The coils 11 are mounted on the two stator cores 13 respectively. The stator cores 13 are preferably semi-circular, and the two stator cores 13 together form a circle. In another preferred embodiment, the stator 10 may have only one circular stator core 13. In the preferred embodiment, the stator 10 is made up of laminations of punched silicon steel sheets. Radial ends of the stator 10 are wrapped by insulation material, and then copper enameled wires are wound around the insulated radial ends to form the coils 11. A number of the coils 11 is plural.

With reference to FIGS. 2, 4, 5, 7, and 10, the driven plate 20 is connected to the output shaft 811. The driven plate 20 covers the stator 10 and is rotatable relative to the stator 10. The driven plate 20 is preferably made of aluminum alloy to reduce weight.

A rotor recess 21 and multiple ventilation holes 22 are formed in the driven plate 20. An opening of the rotor recess 21 is directed towards the engine 81 and is in gaseous communication with the forced heat transfer space 12. The rotor recess 21 has an annular mounting surface 211 and a bottom surface 212. The annular mounting surface 211 is located around the stator 10. The bottom surface 212 is located on a side of the stator 10 such that the stator 10 is located between the bottom surface 212 and the engine 81. To be specific, the rotor recess 21 is a bowl-shaped recess with its opening directed towards the engine 81. The bottom surface 212 has a circular plane and an annular inclined plane. Said annular inclined plane is connected to a circumference of said circular plane and surrounds the circular plane. An end of the output shaft 811 is preferably fixed to the circular plane of the bottom surface 212.

The ventilation holes 22 are formed in the bottom surface 212 of the rotor recess 21 and formed through the driven plate 20. The ventilation holes 22 are disposed apart from each other around the output shaft 811 such that air can enter the rotor recess 21 via the ventilation holes 22 and flows towards the forced heat transfer space 12 via gaps formed between the coils 11. Heat of the coils 11 can be removed by the air.

Figure 10:
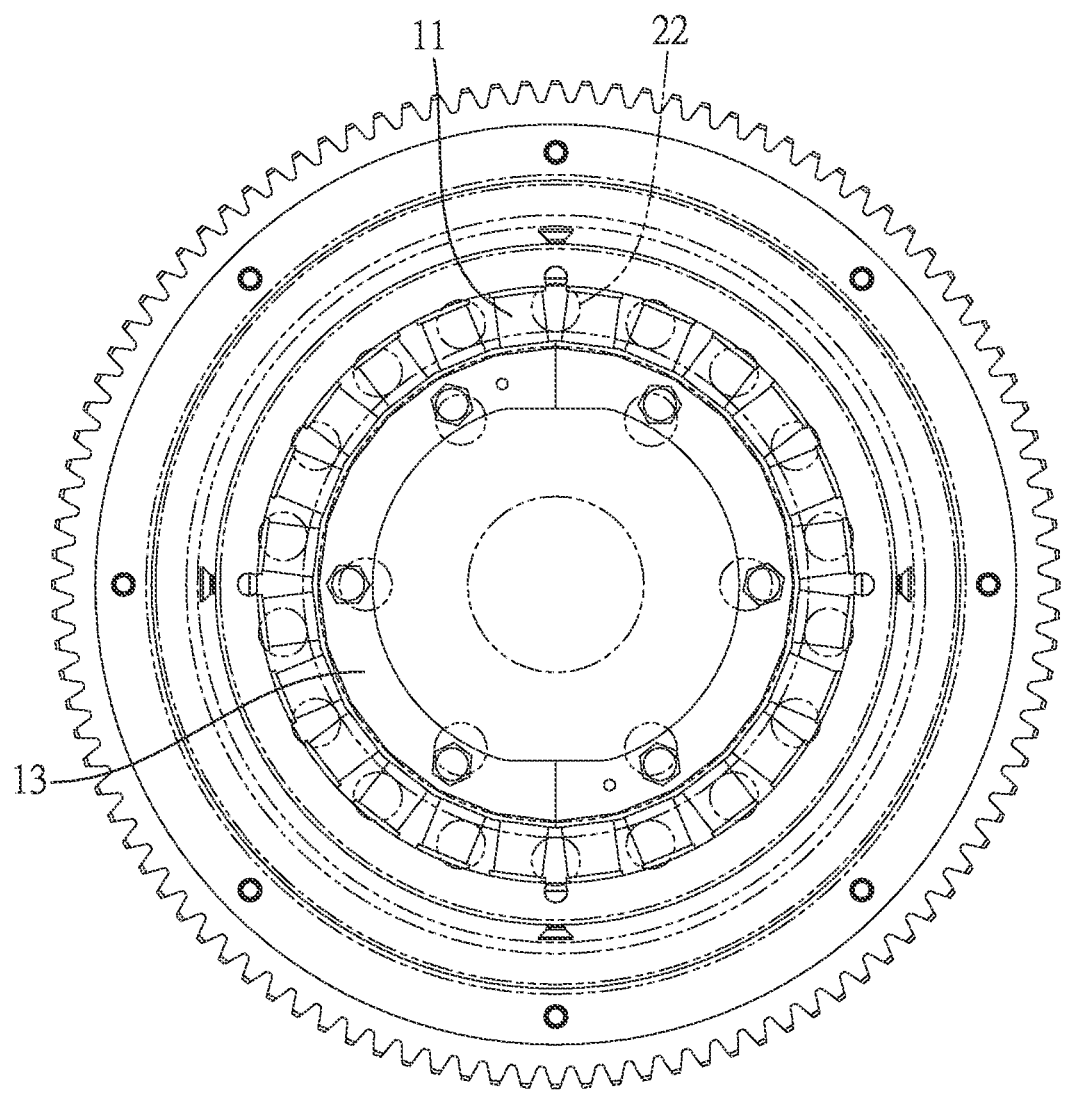
FIG. 10 is a schematic front view of the permanent magnet alternator in FIG. 1.

In the preferred embodiment, the ventilation holes 22 are located on the annular inclined plane of the bottom surface 212, and the ventilation holes 22 correspond in radial position to the coils 11; that is, a distance between the ventilation holes 22 and the output shaft 811 roughly equals a distance between the coils 11 and the output shaft 811. Each one of the ventilation holes 22 corresponds in position to the coils 11 in sequence when the driven plate 13 is rotating relative to the stator 10. The ventilation holes 22 and the coils 11 are at least partially overlapped (as shown in FIG. 10) when viewed from an end of the output shaft 811 to reduce resistance to flow of the air and improve heat dissipation.

With reference to FIG. 2 and FIGS. 5 to 9, the rotor 30 is fixed in the rotor recess 21 and has a magnet-mounting ring 31, multiple ring fasteners 32, and multiple magnets 33. In the preferred embodiment, the rotor 30 further has a magnet dividing frame 34 and a magnet-protecting ring 35.

Figure 8:
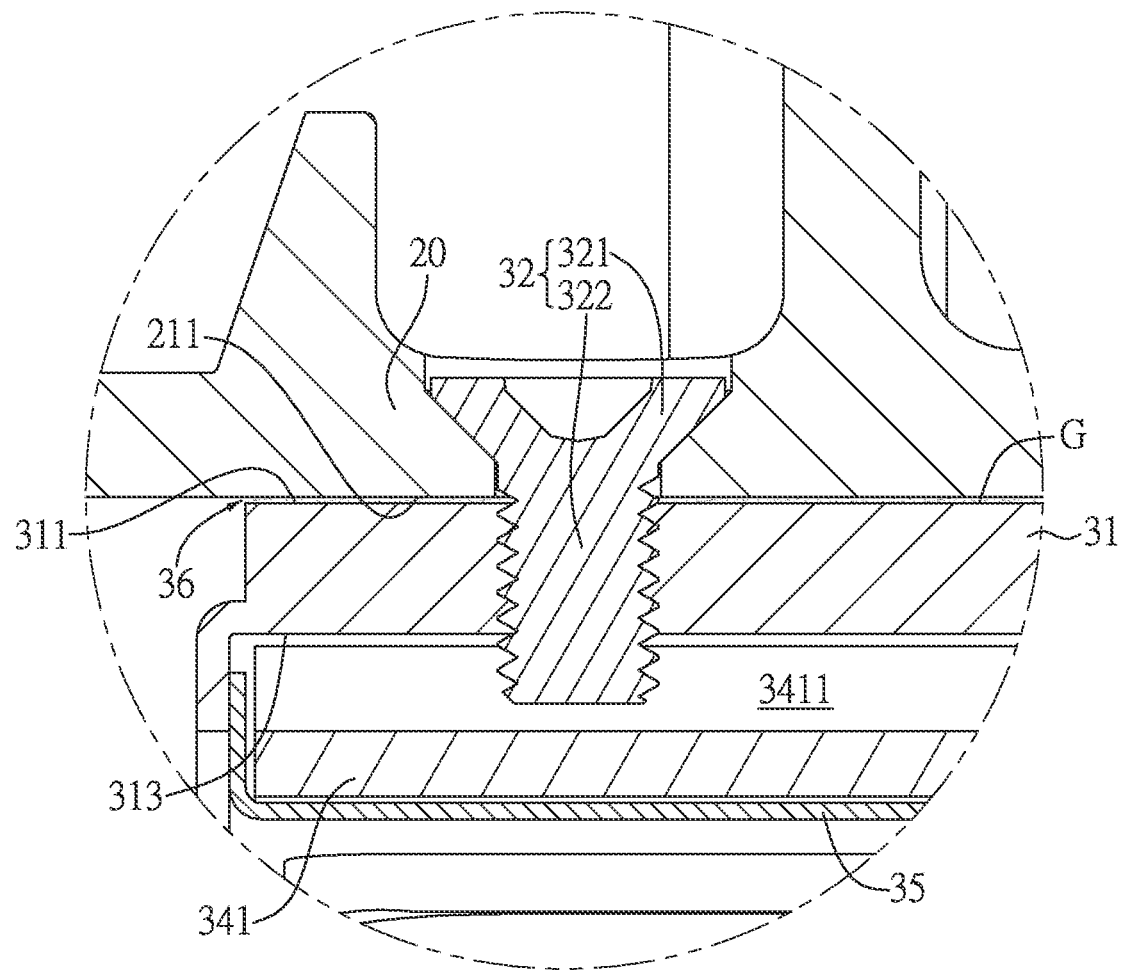
FIG. 8 is a partial enlarged view of FIG. 7.

The magnet-mounting ring 31 is located around the stator 10. An outer annular surface 311 of the magnet-mounting ring 31 is disposed apart from the annular mounting surface 211 of the driven plate 20 to form a radial gap 36 (as shown in FIG. 8) which surrounds the magnet-mounting ring 31. In the preferred embodiment, a solidified adhesive is filled in the radial gap 36, and the ring fasteners 32 are partially located in the radial gap 36. In another preferred embodiment, the radial gap 36 can be a gap with nothing inside.

The ring fasteners 32 are mounted between the magnet-mounting ring 31 and the driven plate 20. The ring fasteners 32 are disposed apart from each other around the magnet-mounting ring 31, and are capable of fixing the magnet-mounting ring 31 in multiple radial positions relative to the driven plate 20; that is, the ring fasteners 32 are capable of fixing the magnet-mounting ring 31 in multiple radial positions relative to the output shaft 811 because the driven plate 20 is mounted to the output shaft 811. Therefore, dynamic imbalance of the assembled driven plate 20 and the rotor 30 can be corrected using the ring fasters 32.

In the preferred embodiment, each one of the ring fasteners 32 has a head portion 321 and a stem portion 322 (as shown in FIG. 8). The head portion 321 abuts against the driven plate 20. The stem portion 322 is mounted through the driven plate 20 and is linearly movable relative to the magnet-mounting ring 31. To be specific, each one of the ring fasteners 32 is preferably a screw that is mounted through the driven plate 20 and screwed into a threaded adjusting hole 312 formed in the outer annular surface 311 of the magnet-mounting ring 31. The radial position of the magnet-mounting ring 31 can be adjusted horizontally and vertically using the ring fasteners 32.

In another preferred embodiment, the stem portion 322 can be mounted through and fastened to the driven plate 20 while an end of the stem portion 322 abuts against the magnet-mounting ring 31. In this case, the ring fasteners 32 can still be used for adjusting the radial position of the magnet-mounting ring 31.

Figure 9:
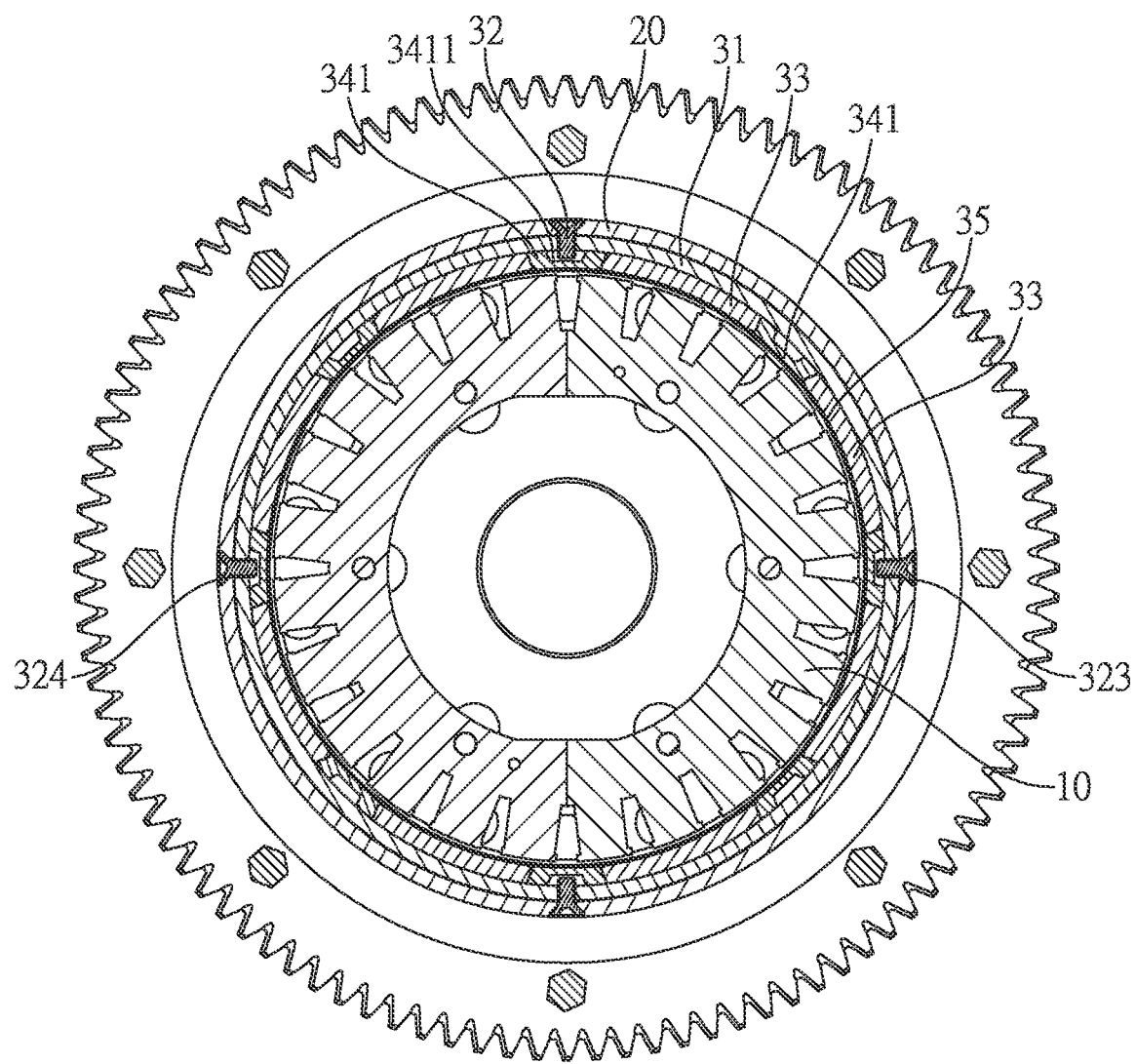
FIG. 9 is another cross-sectional view of the permanent magnet alternator in FIG. 1.

In the preferred embodiment, moving paths of two of the ring fasteners 32 relative to the magnet-mounting ring 31 are aligned. To be specific, a number of the ring fasteners 32 is four, and the ring fasteners 32 are respectively disposed at 3, 6, 9, and 12 o'clock positions of the magnet-mounting ring 31. The ring fastener 32 at 3 o'clock position is a left ring fastener 324 and the ring fastener 32 at 3 o'clock position is a right ring fastener 323 (as shown in FIG. 9). The moving paths of the ring fasteners 323, 324 relative to the magnet-mounting ring 31 are aligned.

In the preferred embodiment, the adhesive G in a proper amount is applied into the rotor recess 21 before inserting the rotor 30 in the rotor recess 21. Then, the rotor 30 is inserted in the rotor recess 21 such that the adhesive G is forced into the radial gap 36. If the center of gravity of the rotor 30 is not aligned with a rotating axis of the output shaft 811, the radial position of the magnet-mounting ring 31 relative to the output shaft 811 can be adjusted using the ring fasteners 32 before the adhesive G solidifies, thereby correcting dynamic imbalance of the assembled drive plate 20 and the rotor 30.

After correcting dynamic imbalance, the alternator is let stand until the adhesive G solidifies to improve bonding strength between the rotor 30 and the driven plate 20. As a result, there is the solidified adhesive G in the radial gap 36 when the alternator is connected to the engine 81. In another preferred embodiment, the adhesive G can be omitted, and the rotor 30 can be connected to the driven plate 20 using only the ring fasteners 32.

The magnets 33 are mounted on an inner annular surface 313 of the magnet-mounting ring 31 and disposed apart from each other around the stator 10 such that the stator 10 can be induced and cuts changing magnetic poles. After the magnets 33, magnet-mounting ring 31 and the driven plate 20 are assembled together, said assembly is capable of serving as a flywheel that stabilizes idle speed of the engine 81. The magnet-mounting ring 31 is preferably made of low-carbon steel to increase the mass of the magnet-mounting ring 31, thereby improving efficacy of stabilizing the idle speed of the engine 81.

The magnet dividing frame 34 is mounted on the inner annular surface 313 of the magnet-mounting ring 31 and has multiple dividing portions 341. The dividing portions 341 and the magnets 33 are arranged in a staggered manner. In the preferred embodiment, each one of the dividing portions 341 has an escape recess 3411 formed in a side, which is directed towards the magnet-mounting ring 31, of the dividing portion 341. Each one of the aforementioned ring fasteners 32 is mounted through the magnet-mounting ring 31 and extends to one of the escape recesses 3411 such that the magnet dividing frame 34 and the ring fasteners 32 do not interfere with each other. Additionally, the escape recesses 3411 prevent the magnets 33 from moving clockwise or counterclockwise.

The magnet-protecting ring 35 is located between the magnets 33 and the stator 10. An outer annular surface of the magnet-protecting ring 35 is attached to the magnets 33, and an inner annular surface of the magnet-protecting ring 35 is disposed apart from the stator 10.

The alternator has a dual-power-supply structure such that the wire W is wound in a way that the stator 10 has two independent output modes that do not interfere with each other. Three configurations of winding arrangements are provided in this invention, and each one of said winding arrangements can be connected to form wye (Y)-connected dual-power supplies or delta-connected dual-power supplies. Details are described as follows.

Figure 11:
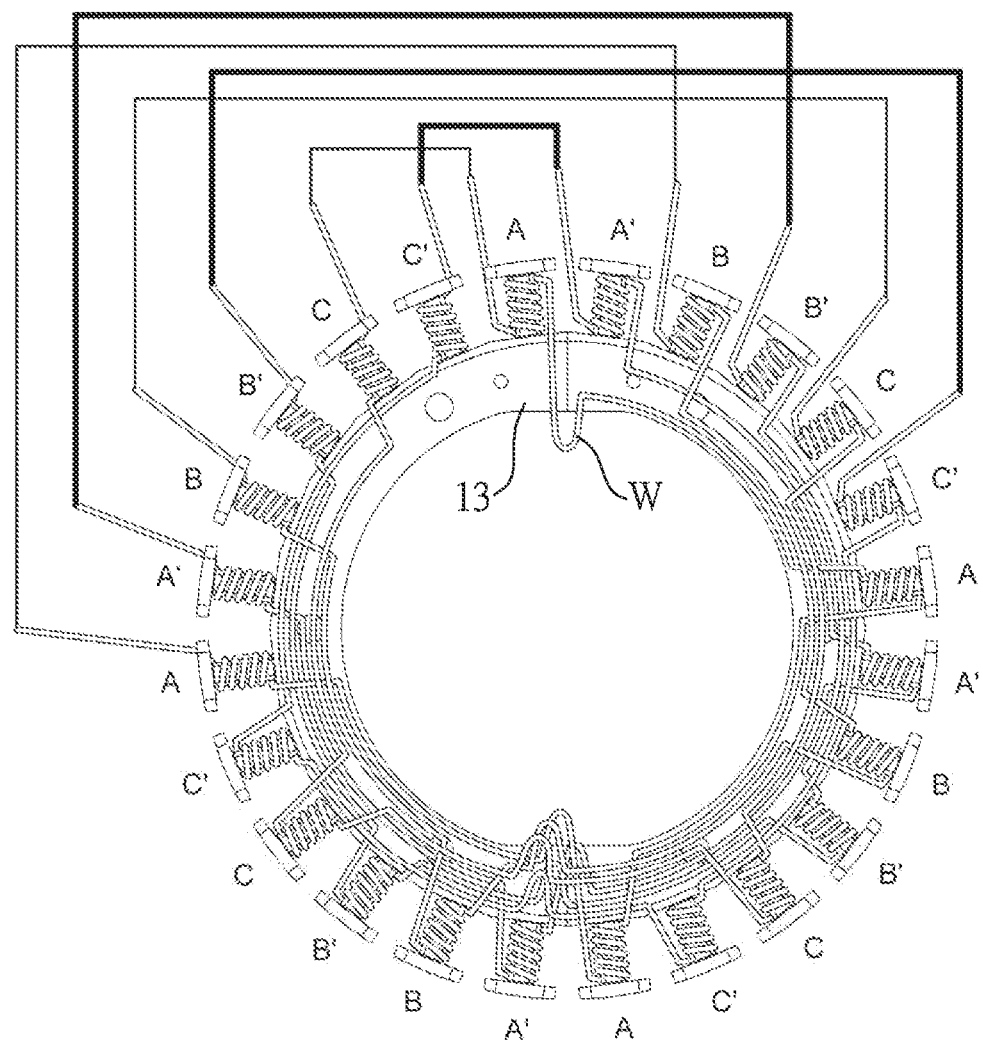
Figure 13:
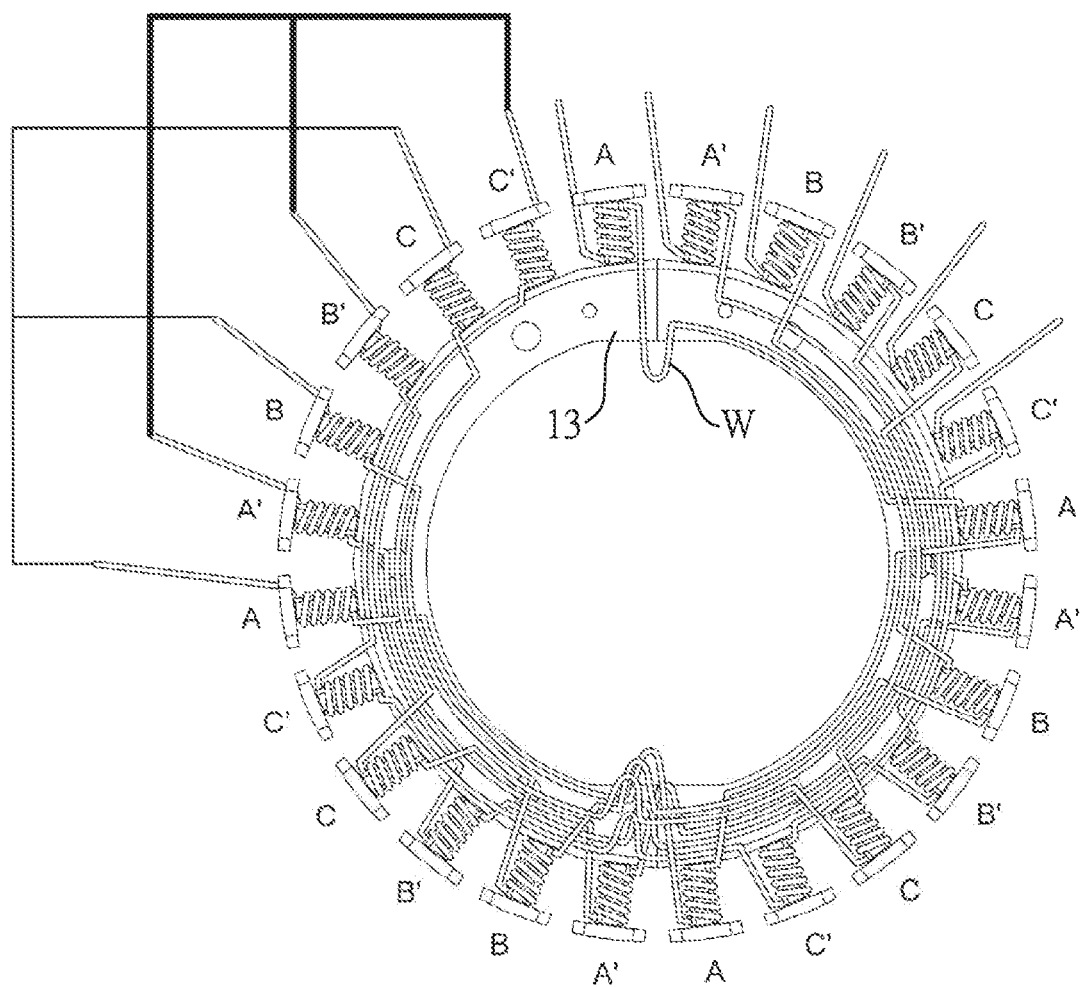

With reference to FIGS. 11 to 14, in a first configuration of the winding arrangements, the coils 11 include coils A, coils B, coils C, coils A', coils B', and coils C'. The coils 11 can be connected to form two delta-connected power supplies (as shown in FIG. 11 and FIG. 12), or two wye-connected 3 phase independent power supplies (as shown in FIG. 13 and FIG. 14). Detailed connection of the coils 11 are as shown in the figures.

In the first configuration of the winding arrangements, the wire W extends from one stator core 13 to the other stator core 13. Extra length of the wire W is reserved at the ends of the stator cores 13 such that the stator cores 13 can be separated during installation without disconnecting the wire W.

In a second configuration of the winding arrangements after-mentioned, the wire W in each of the two stator cores 13 is independent, and the wires W of the two stator cores 13 are connected together using terminals. Any two adjacent coils 11 are wound in reverse directions to conform with electromagnetic induction phenomenon; that is, the coils 11 that are wound clockwise are adjacent to coils 11 that are wound counterclockwise, and a number of the magnets 33 has to be changed according to the winding arrangement.

Figure 15:
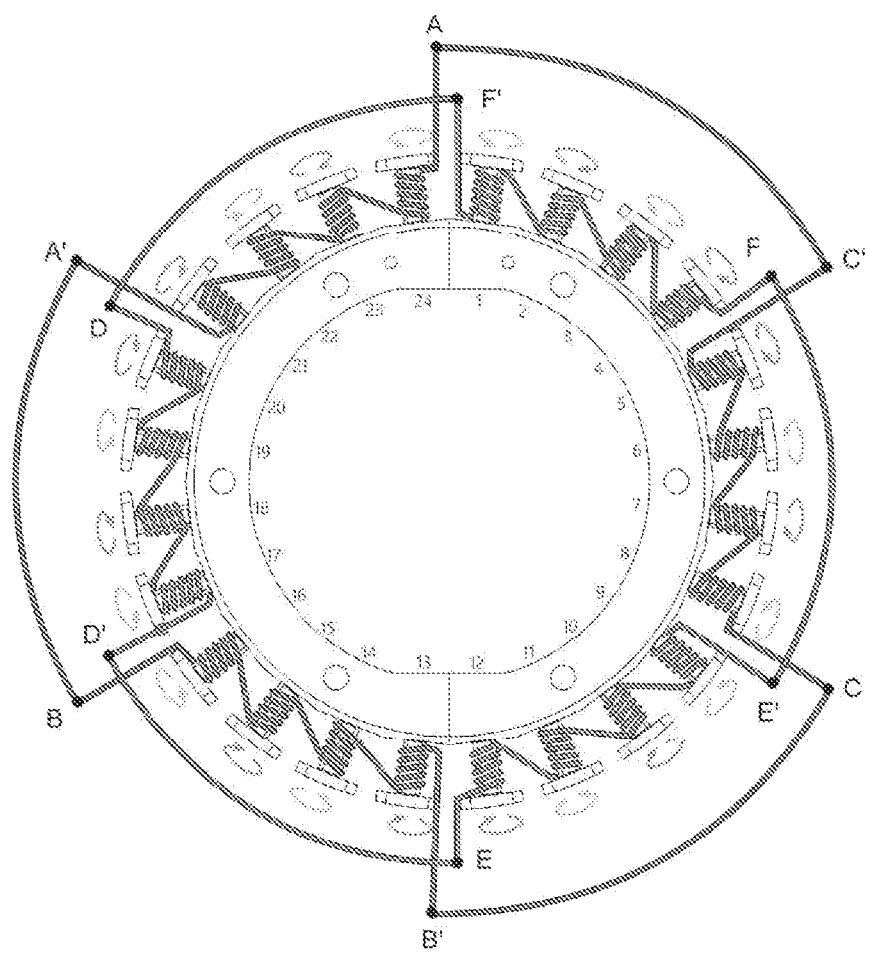
Figure 17:
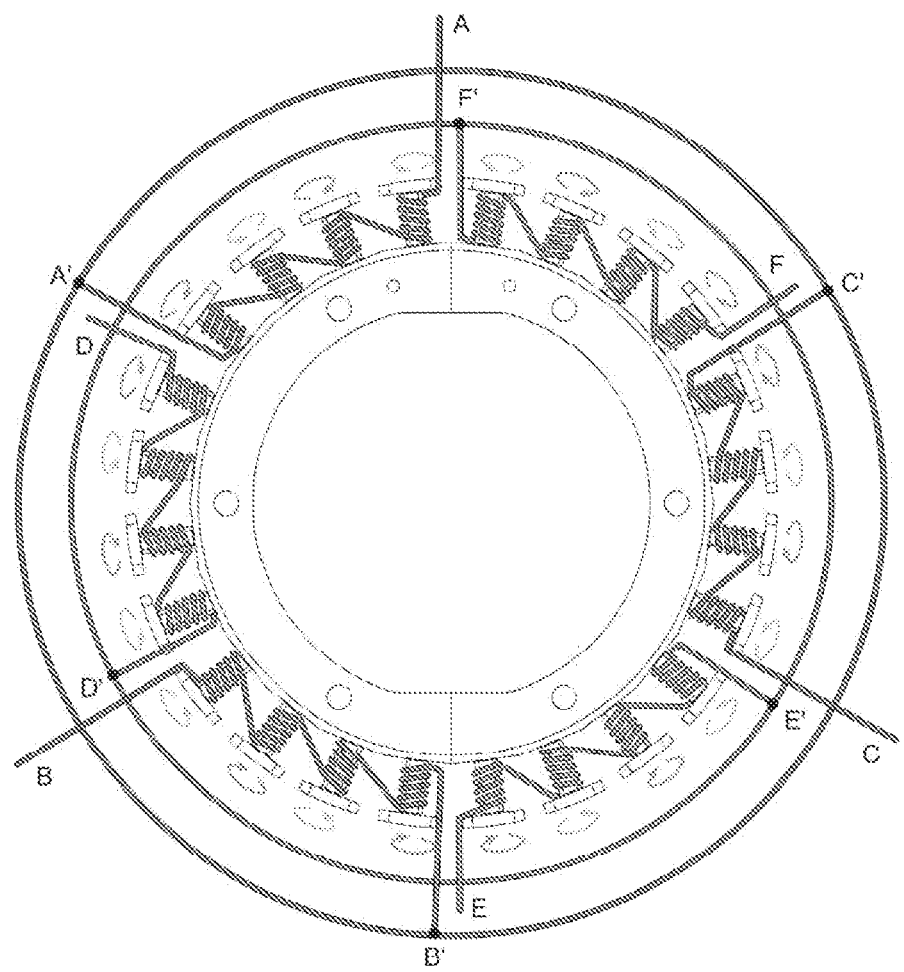

With reference to FIGS. 15 to 18, in the second configuration of the winding arrangements, the coils 11 further include a coil D, a coil D', a coil E, a coil E', a coil F, and a coil F'. The coils 11 can be connected to form two independent 3-phase power supplies, and to be specific, the coils 11 can be connected to form two delta-connected power supplies (as shown in FIG. 15 and FIG. 16). In another preferred embodiment, the coils 11 can be connected to form two independent 3-phase wye-connected power supplies (as shown in FIG. 17 and FIG. 18).

Figure 19:
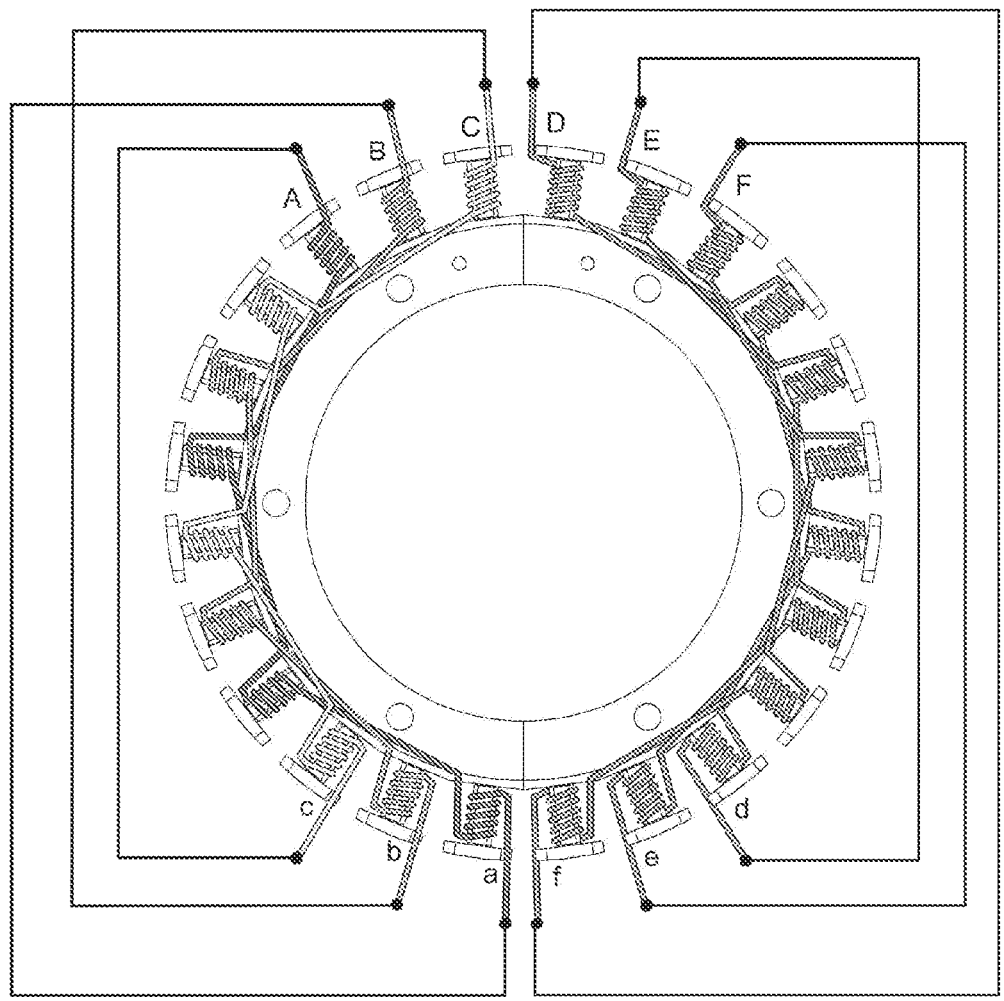
Figure 21:
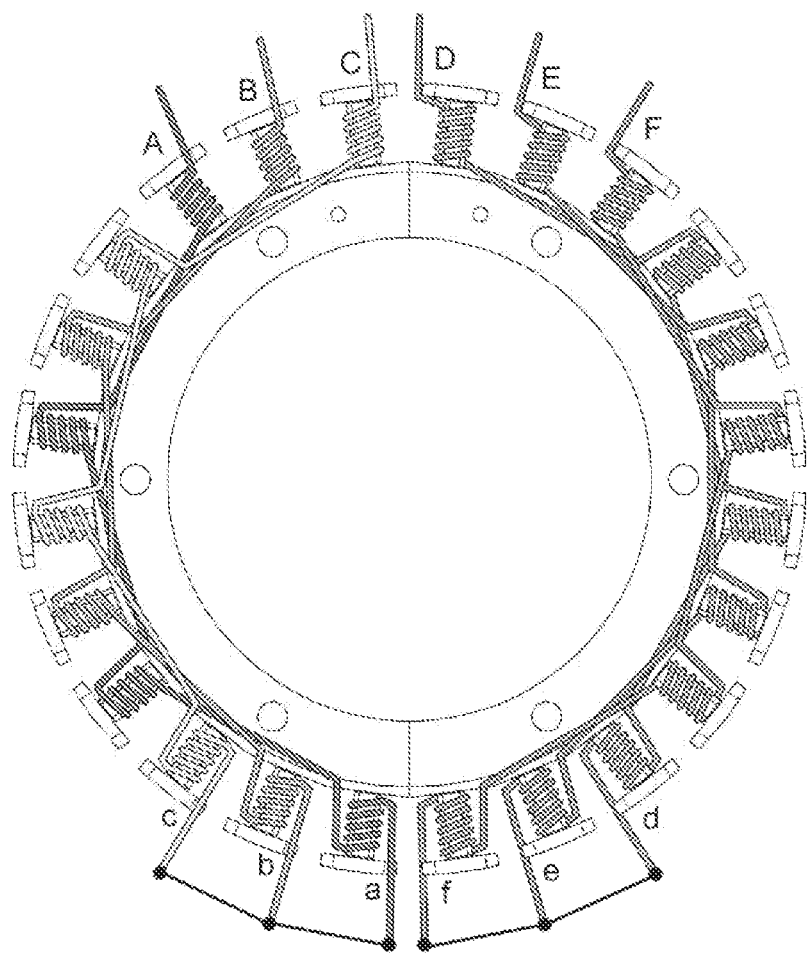

With reference to FIGS. 19 to 22, in a third configuration of the winding arrangements, the coils 11 further include a coil a, a coil b, a coil c, a coil d, a coil e, and a coil f. The coils 11 can be connected to form two independent 3-phase power supplies, and to be specific, the coils 11 can be connected to form two delta-connected power supplies (as shown in FIG. 19 and FIG. 20). In another preferred embodiment, the coils 11 can be connected to form two independent 3-phase wye-connected power supplies (as shown in FIG. 21 and FIG. 22).

To sum up, by forming the radial gap 36 between the rotor 30 and the driven plate 20, the radial position of the center of gravity of the rotor 30 can be adjusted using the ring fasteners 32. Therefore, the alignment between the center of gravity of the rotor 30 and the rotation axis can be corrected using the ring fasteners 32.

Moreover, when the alternator is connected in the front end of the small piston engine 81 that drives the propeller 82, air enters the rotor recess 21 via ventilation holes 22, and then flows through gaps between the coils 11 to remove heat from the stators 10.

Finally, the assembled driven plate 20 and the rotor 30 stabilize idle speed of the engine 81, and therefore the engine 81 does not have to install a standalone flywheel, thereby reducing weight.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A permanent magnet alternator, adapted to be connected to an engine and the permanent magnet alternator comprising:
   a stator adapted to be mounted on an end of the engine; the stator disposed apart from the engine to form a forced heat transfer space; the forced heat transfer space being in gaseous communication with an external space; the stator having
      multiple coils; the coils disposed apart from each other around an output shaft of the engine;
   a driven plate adapted to be connected to the output shaft of the engine; the driven plate covering the stator and being rotatable relative to the stator; the driven plate having:
      a rotor recess formed in the driven plate; an opening of the rotor recess directed towards the engine and being in gaseous communication with the forced heat transfer space; the rotor recess having:
         an annular mounting surface located around the stator; and
         a bottom surface, wherein the stator is located between the bottom surface and the engine; and
      multiple ventilation holes formed in the bottom surface of the rotor recess and formed through the driven plate; the ventilation holes disposed apart from each other around the output shaft; wherein air is capable of entering the rotor recess via the ventilation holes and flowing towards the forced heat transfer space via gaps formed between the coils; and
   a rotor fixed in the rotor recess and having:
      a magnet-mounting ring located around the stator; an outer annular surface of the magnet-mounting ring disposed apart from the annular mounting surface of the rotor recess to form a radial gap;
      multiple ring fasteners mounted between the magnet-mounting ring and the driven plate; the ring fasteners disposed apart from each other around the magnet-mounting ring; the ring fasteners being capable of fixing the magnet-mounting ring in multiple radial positions relative to the driven plate; and
      multiple magnets mounted on an inner annular surface of the magnet-mounting ring; the magnets disposed apart from each other around the stator.

2. The permanent magnet alternator as claimed in claim 1, wherein each one of the ring fasteners has:
   a head portion abutting against the driven plate; and
   a stem portion mounted through the driven plate and connected to the magnet-mounting ring; the stem portion being linearly movable relative to the magnet-mounting ring.

3. The permanent magnet alternator as claimed in claim 2, wherein each one of the ring fasteners is a screw that is mounted through the driven plate and screwed into the magnet-mounting ring.

4. The permanent magnet alternator as claimed in claim 2, wherein moving paths of two of the ring fasteners are aligned.

5. The permanent magnet alternator as claimed in claim 4, wherein a solidified adhesive is filled in the radial gap between the magnet-mounting ring and the driven plate.

6. The permanent magnet alternator as claimed in claim 5, wherein the ventilation holes correspond in radial position to the coils; each one of the ventilation holes corresponds in position to the coils in sequence when the driven plate is rotating relative to the stator.

7. The permanent magnet alternator as claimed in claim 6, wherein the rotor has a magnet dividing frame mounted on the inner annular surface of the magnet-mounting ring; the magnet dividing frame has
   multiple dividing portions; the dividing portions and the magnets arranged in a staggered manner; each one of the dividing portions having an escape recess formed in a side, which is directed towards the magnet-mounting ring, of the dividing portion; wherein each one of the ring fasteners is mounted through the magnet-mounting ring and extends to the escape recess of one of the dividing portions.

8. The permanent magnet alternator as claimed in claim 7, wherein
   the engine has two casings located on two opposite sides of the output shaft; the two casings are connected and arranged along a radial direction of the output shaft;
   the stator has two stator cores; the two stator cores are mounted on the two casings respectively and are semi-circular; and
   the coils are mounted on the two stator cores respectively.

9. The permanent magnet alternator as claimed in claim 8, wherein
   the driven plate is made of aluminum alloy; and
   the magnet-mounting ring is made of low-carbon steel.

10. The permanent magnet alternator as claimed in claim 1, wherein a solidified adhesive is filled in the radial gap between the magnet-mounting ring and the driven plate.

11. The permanent magnet alternator as claimed in claim 1, wherein the ventilation holes correspond in radial position to the coils; each one of the ventilation holes corresponds in position to the coils in sequence when the driven plate is rotating relative to the stator.

12. The permanent magnet alternator as claimed in claim 1, wherein the rotor has a magnet dividing frame mounted on the inner annular surface of the magnet-mounting ring; the magnet dividing frame has
   multiple dividing portions; the dividing portions and the magnets arranged in a staggered manner; each one of the dividing portions having an escape recess formed in a side, which is directed towards the magnet-mounting ring, of the dividing portion; wherein each one of the ring fasteners is mounted through the magnet-mounting ring and extends to the escape recess of one of the dividing portions.

13. The permanent magnet alternator as claimed in claim 1, wherein
   the engine has two casings located on two opposite sides of the output shaft; the two casings are connected and arranged along a radial direction of the output shaft;

the stator has two stator cores; the two stator cores are mounted on the two casings respectively and are semi-circular; and the coils are mounted on the two stator cores respectively.

14. The permanent magnet alternator as claimed in claim 1, wherein the driven plate is made of aluminum alloy; and the magnet-mounting ring is made of low-carbon steel.

\* \* \* \* \*